US007638766B1

(12) United States Patent
Schoen

(10) Patent No.: US 7,638,766 B1
(45) Date of Patent: Dec. 29, 2009

(54) COMPACT QUADRUPOLE MASS SPECTROMETER

(75) Inventor: Alan E. Schoen, Saratoga, CA (US)

(73) Assignee: Thermo Finnigan LLC, San Jose, CA (US)

( * ) Notice: Subject to any disclaimer, the term of this patent is extended or adjusted under 35 U.S.C. 154(b) by 438 days.

(21) Appl. No.: 11/601,342

(22) Filed: Nov. 17, 2006

(51) Int. Cl.
*B01D 59/44* (2006.01)
*H01J 49/00* (2006.01)

(52) U.S. Cl. ....................... 250/292; 250/282; 250/290; 250/281

(58) Field of Classification Search ................. 250/281, 250/282, 290, 292, 293
See application file for complete search history.

(56) References Cited

U.S. PATENT DOCUMENTS 5,616,919 A * 4/1997 Broadbent et al. .......... 250/292
7,064,322 B2 * 6/2006 Crawford et al. ............ 250/290
7,276,688 B2 * 10/2007 Weiss ......................... 250/288
2005/0145790 A1 * 7/2005 Wang ......................... 250/292

* cited by examiner

*Primary Examiner*—Jack I Berman
*Assistant Examiner*—Hanway Chang
(74) *Attorney, Agent, or Firm*—Sharon Upham; Michael C. Staggs

(57) ABSTRACT

The current invention facilitates the construction of a compact high performance quadrupole mass analyzer which has the operational characteristics of a modern research grade system and the ergonomic and cost structure of a moderate benchtop system. A multipole field device is physically located within the windings of the RF resonant circuit. By combining the space consumed by the RF windings and its housing and the space consumed by the multipole field device and its vacuum housing, the overall size of the resultant mass spectrometer is reduced.

18 Claims, 2 Drawing Sheets

COMPACT QUADRUPOLE MASS SPECTROMETER

FIELD OF THE INVENTION

The disclosed embodiments of the present invention relates generally to the field of mass spectrometry.

BACKGROUND OF THE INVENTION

RF quadrupole and multipole field devices are used in mass spectrometry and related applications. These devices are generally used for containment, guiding, transport, ion fragmentation, mass (or mass-to-charge ratio) selective sorting, and production of mass (or mass-to-charge ratio) spectra of beams or populations of ions. Generally described, multipole field devices consist of four or more elongated electrodes that bound an interior region through which ions are transmitted or contained. The ion trapping and sorting with these devices typically requires the establishment of a RF or combined RF and DC potential field which typically varies in a multi-polar spatial manner. A radio frequency (RF) voltage is applied to alternating elongated electrode pairs to generate an RF field which confines ions radially and prevents ion loss from arising from collision with the elongated electrodes. The performance of a RF multipole device is generally determined by its ability to transmit ions, the mass-to-charge ratio of ions it can transmit, its accuracy and in the case of a quadrupole mass filter, its resolution. These abilities are determined in part by the accuracy of the multipole elongated electrode assembly and the quality of the potentials generated by the electronics.

FIG. 1 shows a perspective view of a multipole field device 100 having four elongated electrodes of substantially identical construction arranged in circular array. Alternate elongated electrodes are connected together to form two sets (X and Y) of two elongated electrode pairs, the X elongated electrodes 102, 104 and the Y elongated electrodes 106, 108. The multipole field assembly 100 is typically disposed in a vacuum housing 110 or a differentially pumped region within a mass spectrometer. Though the elongated electrodes illustrated provide for rods that are of equal size, shape and with the same cross-sectional area, optionally the elongated rods may have different cross-sectional areas and/or be of different size and shape. The size and shape and disposition of the rods can be utilized to select the multipole field configuration desired.

FIG. 1 also illustrates how the X 102, 104 and Y 106, 108 elongated electrode pairs are connected to the DC and RF voltages which emanate from power sources that reside in a region 114 outside of the vacuum housing 110. The two sets of elongated electrodes are connected to opposite phases of an RF source, so that RF voltages of equal magnitude but opposite signs are applied. As illustrated, the RF voltage source drives the primary winding 116 of a tuned RF transformer 120 to produce high RF voltages at the end connection points of secondary windings 118 of the tuned circuit RF transformer 120, which subsequently connect to the X and Y elongated electrodes 102, 104, 106, 108.

The reason that RF tuned transformers are used in combination with multipole devices is that they are able to generate high RF voltages in the frequency range needed for RF quadrupole/multipole devices with relatively modest amounts of RF power. The secondary windings 118 of the transformer are, in essence, very large solenoid inductors. The connection of the secondary windings 118 to the elongated electrodes puts an almost purely capacitive reactance across the inductor creating an LC resonant circuit. Since there is essentially no resistive component to this load the only source of damping is the resistance of the wire in the coil windings and the resistive losses associated with induced currents in the circuit enclosure. Hence this LC circuit has a very high quality, Q, and a correspondingly narrow resonant bandwidth. A basic characteristic of such circuits is that if you drive them within their resonant band they produce a large voltage response with very low harmonic content. It is this property which is utilized to create a very efficient means of RF voltage transformation.

There is a need for compact mass spectrometers and consequently compact multipole field designs are sought. Compact systems have been suggested which address the physical size of the RF generator by using smaller transformer windings and reducing the power requirements by using smaller multipole field devices, for example quadrupoles with smaller $r_0$s (where $r_0$ is the dimension between the central axis and the apex of the hyperbolic rod, or other shaped rod if an alternative is utilized) and lower frequencies. This approach has a negative impact on system performance. Ion beam acceptance is related to the physical design of a system's overall ion optics. In most cases, small simply will not work.

Since thermal drift can have a significant impact on an instrument's accuracy and performance, there is a need to keep mechanical dimensions of the elongated electrodes constant with respect to environmental considerations. To reduce the effect of thermal drift on an instrument's accuracy and performance, conventional methods typically attempt to control a thermal environment surrounding the entire instrument and/or portions of the instrument, such as the control electronics for example. Typically, the RF voltage source, including the RF transformers, are located in a separate chamber than the multipole device itself, enabling cooling of the transformers to be carried out in a region isolated from the multipole field device and minimizing the impact that one has on the other.

In view of the above, if performance is crucial, larger sized multipole field devices, higher frequency and a corresponding higher voltage is desirable. There are physical limits which restrict the choice of parameters but with a given desired maximum mass, the other parameters may be optimized.

The present invention recognizes the difficulty of realizing a compact design while avoiding the aforementioned design constraints.

SUMMARY

According to an aspect of the instant invention, there is provided a multipole field device in mass spectrometry system comprising: a plurality of elongated electrodes arranged around a longitudinal axis and defining an interior region, the elongated electrodes having a central core and a conductive layer, the conductive layer configured to not form a significant closed circuit in a dimension transverse to the longitudinal axis; and a radio-frequency voltage source having windings, the voltage source coupled to at least one of the elongated electrodes, for establishing an RF field that radially confines the ions, the windings disposed in a co-axial relationship with the longitudinal axis and located exterior to the elongated electrodes.

According to another aspect of the instant invention there is provided a mass spectrometer incorporating a multipole device, the mass spectrometer comprising: a vacuum housing which houses a plurality of elongated electrodes and windings of a radio-frequency voltage source; the plurality of elongated electrodes having a central core and a conductive layer, the conductive layer configured to not form a significant closed circuit in a dimension transverse to the longitudinal axis; the radio-frequency voltage source coupled to at least one of the elongated electrodes, for establishing an RF field that radially confines the ions, the radio-frequency voltage source having windings disposed in a co-axial relationship with the longitudinal axis and located exterior to the elongated electrodes.

Particular implementations can include one or more of the following features. The central core can have an outer perimeter, and the conductive layer can extend partially around the outer perimeter of the central core. The conductive layer can be coaxial to the central core and comprise a gap. The central core can be hollow, and/or comprise a lossless dielectric material. The multipolar device and the windings can be disposed in a common chamber of the mass spectrometry system.

The invention can be implemented to realize one or more of the following advantages. The conductive layer can minimize the existence of eddy currents. The multipolar device and the windings can be disposed in a common chamber of the mass spectrometry system, hence providing for a more compact mass spectrometer.

BRIEF DESCRIPTION OF THE DRAWINGS

For a better understanding of the nature and objects of the invention, reference should be made to the following detailed description, taken in conjunction with the accompanying drawings, in which.

Like reference numerals refer to corresponding parts throughout the several views of the drawings.

DETAILED DESCRIPTION OF EMBODIMENTS

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein.

The current invention facilitates the construction of a compact high performance quadrupole mass analyzer which has the operational characteristics of a modern research grade system and the ergonomic and cost structure of a moderate benchtop system.

Figure 1:
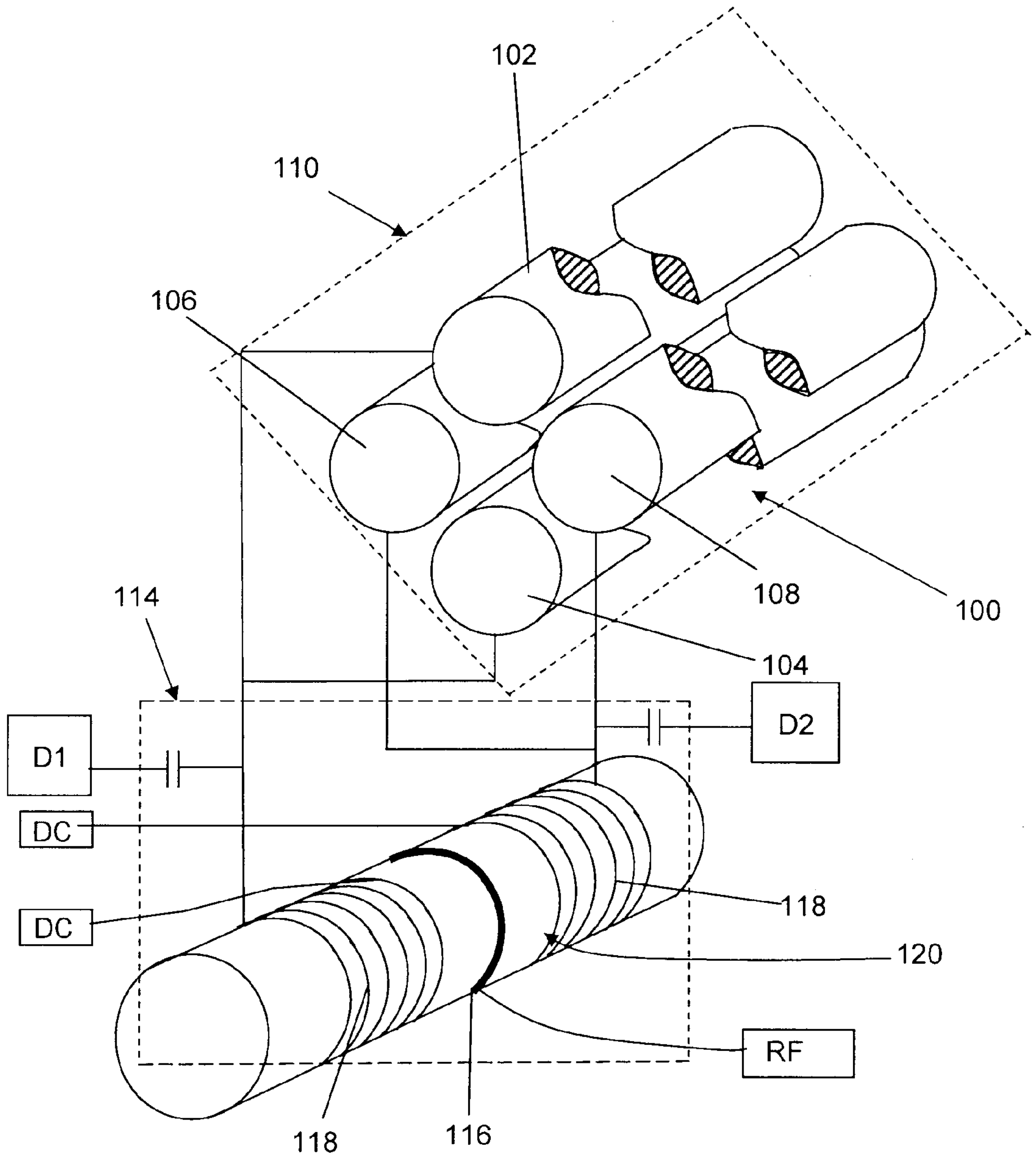
FIG. 1 is a schematic representation of a conventional multipole field device driven by a resonant circuit.
Figure 2A:
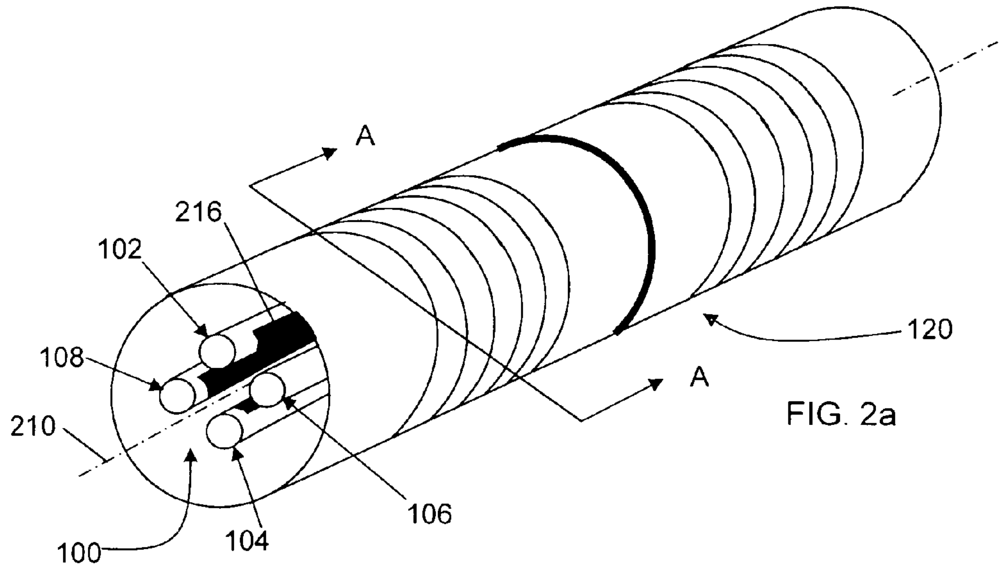
FIG. 2*a* depicts a multipole field device disposed within a resonant circuit according to an aspect of the current invention (power sources and detectors omitted).

FIG. 2*a* illustrates the use of a multipole field device 100 physically located within the windings 116/118 of the RF transformer 120. The benefits of such a configuration are at least two-fold. Firstly, the space consumed by the RF transformers' windings 116/118 and its housing (114 in FIG. 1) and the space consumed by the multipole field device 100 and its vacuum housing (110 in FIG. 1) may be combined to reduce the overall size of the resultant mass spectrometer. Secondly, the combination of the RF housing (114 in FIG. 1) with the vacuum housing (110 in FIG. 1) reduces system part count and cost, and eliminates the need for expensive high voltage RF feedthroughs.

As depicted, the multipole field device 100 includes two pairs (X and Y) of elongated conductive elongated electrodes 102, 104, 106, 108, disposed in a configuration that provides a quadrupole field through which ions of the material under investigation travel. As shown, the elongated electrodes 102, 104, 106, 108 are arranged longitudinally in a circular array around a central axis 210. Each elongated electrode 102, 104, 106, 108 is typically conductive and has a generally cylindrical shape. Though the elongated electrodes illustrated provide for rods that are equally sized and shaped, optionally the elongated rods can be of different size and shape. The size, shape and disposition of the elongated electrodes can be utilized to provide the desired multipole field configuration desired or to facilitate manufacture and reduce cost. The elongated electrodes 102, 104, 106, 108 are arranged in spaced-apart, mutually parallel relation (parallel to longitudinal central axis 210) and are of equal length. The transverse spacing between adjacent elongated electrodes is shown as being identical, such that the elongated electrode centers define a square in the radial plane or transverse dimension (orthogonal to the longitudinal central axis 210). Optionally, the spacing between adjacent elongated rods can differ, once again providing for desired characteristics of multipolar fields to be created.

To enable the invention to perform adequately, the multipole field device 100 must not inhibit the operation of the RF windings 116/118 of the transformer 120 and visa versa. To facilitate this, the elongated electrodes 102, 104, 106, 108 are formed from a lossless dielectric central core 212 and coated over the quadrupole field forming surfaces 214 with a thin conductive layer 216. Many electrode designs using ceramic and metal, the combination forming a thin film electrode are known. As with the known designs, the central core 212 supplies the structural strength and the metal forms a conductive layer 216. Optionally, the conductive layer 216 for each distinct core can be selected such that when an arbitrary number of the electrodes are combined, they produce an arbitrary combination of multipole field contributions.

Figure 2B:
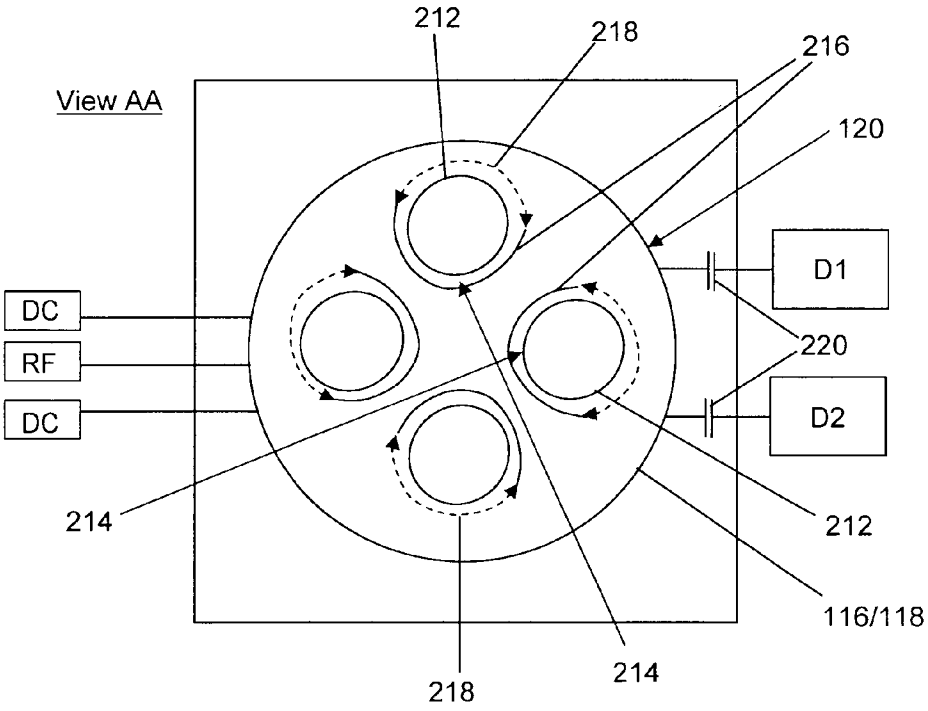
FIG. 2*b* depicts a cross-section of FIG. 2*a*, taken along A-A (power sources and detectors included).

Whenever the primary winding 116 of the transformer 120 is energized by an alternating-current source, a fluctuating field is produced. This magnetic field cuts the conducting material and induces a voltage into it. The induced voltage causes currents to flow in the conductive material which dissipates in the form of heat. These undesirable currents are called Eddy currents. Eddy currents are closed loops of induced current circulating in planes that are orthogonal to the magnetic flux (in the plane of the paper as illustrated with respect to FIG. 2). In addition, Eddy currents decrease exponentially with depth (the skin effect). To minimize the loss resulting from eddy current, the conductive layer 216 of the elongated electrodes are created such that there is no closed loop, an easy path for current is not provided.

The conductive layer 216 of the current invention as described herein extends only partially around the outer perimeter of the circular central core 212, forming a gap 218 in the conductive layer 216 that extends along the length of the central core 212. The conductive layer 216 is such that it does not form a complete loop or a closed circle as found in conventional coated elongated electrodes. The conductive layer 216, with its gap 218, have insufficient cross-section to allow significant eddy currents to form when the multipole field device 100 is placed within RF windings 116/118 of the transformer 120, so it has little effect or impact on the fields created. The existence of this gap 218 limits any eddy currents created to the thickness of the conductive layer 216 and the losses due to the power consumed by these short circuited eddy currents is minimized.

In an alternative embodiment, the central core 212 may be hollow in structure and the conductive layer 216 may be coated on the outside of the hollow central core 212. Typically the central core 212 comprises an insulative material such as a loss-less dielectric, a ceramic, rebonded fused silica or beryllium oxide for example. The conductive layer 216 comprises a conductive material such as copper, silver, gold, platinum, tin, indium, nickel, aluminum, steel, beryllium, tungsten or alloys of such conductive materials or conductive inks for example.

As known in the art, multipole field devices 100 will typically include two or more holder structures (not depicted), fabricated from an electrically insulative material such as a ceramic, which fix the spacing and orientation of the elongated electrodes in the desired manner. While the elongated electrodes are depicted as being relatively widely spaced for the purpose of clarity, those skilled in the art will recognize that the actual spacing between adjacent elongated electrodes for a typical ion guide application will be considerably smaller than depicted in the figure according to the physics of the desired device.

In general terms, the circuit used to connect the selection parameter of the analogue system (e.g. the RF voltage) to the component(s) that facilitate mass selection/ejection in the mass analyzer (e.g. for a quadrupole mass filter, the quadrupole and the elongated electrode drivers) comprises a tank circuit. This tank circuit supplies the RF voltage to the multipole field devices, the quadrupole mass filter, the 2- and 3-D quadrupole ion trap mass analyzer, for example. The RF resonant transformer secondary windings of the tank circuit are used to transfer RF and DC to the multipole field device 100. The tank circuit controls a primary winding 116 and secondary windings 118 connected to the multipole field device 100. (One should note that the tank circuit comprises the multipole field device along with the primary and secondary windings). The multipole field device 100 represents capacitance. Q is a parameter that defines the quality of a resonant circuit, and it is defined as the ratio of the center frequency to the bandwidth at the 3 dB point.

Good spectra depend on a pure RF, both in frequency content and amplitude stability. The contribution of the tank circuit quality or Q to this is considerable. The higher the value of Q for the tank circuit, the greater its ability to reject harmonics. Harmonics cause errors in the RF amplitude, which provides the feedback to regulate the commanded mass selection voltage. The higher the value of Q for the tank circuit, the less power loss and heating experienced in the circuit, and the more stable the resonant frequency.

There are at least two concerns that arise when contemplating placing a multipole field device 100 within the windings 116, 118 of a coil of a transformer 120, and then placing the combination into a common chamber, the vacuum chamber of a mass spectrometer. Firstly, the Q of the tank circuit may require that too much power is needed to reach the desired voltage if the multipole field device 100 absorbs the energy. Secondly, there is no convection cooling so any heat generated by the secondary windings will build up and increase the wire resistance.

Large windings of a transformer have a higher Q and correspondingly lower power requirements for a given maximum voltage. By combining the transformer housing with the vacuum housing, the space constraints can be relieved without compromising performance. By eliminating the high voltage RF feedthroughs other system restraints are eliminated as the feedthrough breakdown voltage limit may be lower than the multipole field device limit. The maximum RF voltage is now determined by the quality of the vacuum and the spacing between the adjacent elongated electrodes which are optimally larger anyway. The RF voltage applied to each set (X, Y) of elongated electrodes is sensed by two capacitors 220. One capacitor is connected to each of the secondary windings 118 of the RF transformer 120. Thus each capacitor 220 is connected to one pair of elongated electrodes. These capacitors ultimately lead to the detectors D1, D2. These detector capacitors 220 can be incorporated into the quadrupole elongated electrode assembly and placed with the vacuum so that only low voltage detector feedthroughs, low voltage offset and elongated electrode DC feedthroughs and the RF primary feedthrough are required. In another embodiment, the RF detector capacitor is included in the quadrupole assembly with a thin film coating on the backs of the elongated electrodes near the ends. (According to U.S. Pat. No. 6,424,515 where we combine the feedthrough with the detector).

It is understood that the above description in intended to be illustrative of the invention, and not restrictive. Numerous other embodiments may be envisaged without departing from the spirit and scope of the invention. For example, the number of elongated electrodes may exceed four. The cross-sectional area of the elongated electrodes can be hyperbolic, circular, elliptical, or any other shape. The conductive layer 216 can be provided by thin films, bonding, plating, chemical deposition methods, or any other such deposition method. The conductive layer can comprise a single layer or multiple layers.

What is claimed is:

1. A multipole field device in a mass spectrometry system comprising:

a plurality of elongated electrodes arranged around a longitudinal axis and defining an interior region, the elongated electrodes having a central core and a conductive layer, the conductive layer configured to not form a significant closed circuit in a dimension transverse to the longitudinal axis; and a radio-frequency voltage source having windings, the voltage source coupled to at least one of the elongated electrodes, for establishing an RF field that radially confines the ions, the windings disposed in a co-axial relationship with the longitudinal axis and located exterior to the elongated electrodes.

2. The multipole field device of claim 1, wherein the conductive layer minimizes the existence of eddy currents.

3. The multipole field device of claim 1, wherein the central core has an outer perimeter and the conductive layer extends partially around the outer perimeter.

4. The multipole field device of claim 3, wherein the multipole field device has quadrupole field forming surfaces, and the conductive layer extends over quadrupole field forming surfaces.

5. The multipole field device of claim 1, wherein the conductive layer is coaxial to the central core and comprises a gap.

6. The multipole field device of claim 1, wherein the conductive layer comprises a thin film material.

7. The multipole field device of claim 1, wherein the central core is a lossless dielectric.

8. The multipole field device of claim 1, wherein the central core is hollow.

9. The multipole device of claim 1, wherein the multipolar field device is one of a collision cell, a mass filter, a quadrupole, an ion guide, or an ion trap.

10. The multipole device of claim 1, wherein the conductive layer provides for an arbitrary combination of multipole field contributions.

11. The multipole device of claim 1, wherein the multipolar field device and the windings are disposed in a common chamber of the mass spectrometry system.

12. The multipole device of claim 1, wherein the Q of the windings is greater than 100.

13. A mass spectrometer incorporating a multipole device, the mass spectrometer comprising:

a vacuum housing which houses a plurality of elongated electrodes and windings of a radio-frequency voltage source;

the plurality of elongated electrodes arranged around a longitudinal axis and defining an interior region, each elongated electrode having a central core and a conductive layer, the conductive layer configured to not form a significant closed circuit in a dimension transverse to the longitudinal axis; and the radio-frequency voltage source having windings, the voltage source coupled to at least one of the elongated electrodes for establishing an RF field that radially confines the ions, the windings disposed in a co-axial relationship with the longitudinal axis and located exterior to the elongated electrodes.

14. A mass spectrometer of claim 13, wherein the conductive layer minimizes the existence of eddy currents.

15. A mass spectrometer of claim 13, wherein the central core has an outer perimeter and the conductive layer extends partially around the outer perimeter.

16. A mass spectrometer of claim 13, wherein the multipole field device has quadrupole field forming surfaces, and the conductive layer extends over quadrupole field forming surfaces.

17. A mass spectrometer of claim 13, wherein the multipolar field device is one of a collision cell, a mass filter, a quadrupole, an ion guide, or an ion trap.

18. A mass spectrometer of claim 13, wherein the multipolar field device and the windings are disposed in a common chamber of the mass spectrometry system.

* * * * *